UNITED STATES PATENT OFFICE.

THOMAS NELSON, OF WEST TROY, NEW YORK.

IMPROVED PROCESS FOR MAKING EMERY-WHEELS.

Specification forming part of Letters Patent No. 53,032, dated March 6, 1866.

*To all whom it may concern:*

Be it known that I, THOMAS NELSON, of West Troy, in the county of Albany and State of New York, have invented a new and improved method of uniting particles of disintegrated emery, corundum, and other gritty substances into a solid mass of any desired shape for grinding, cutting, filing, or polishing purposes; and I do hereby declare that the following is a full, clear, and exact description of said method.

The nature of my invention consists in the thorough incorporation of some natural or artificial alkaline silicious substance with disintegrated emery, corundum, or other keen gritty material, in such proportions as shall, under the influence of a proper degree of heat, cause, by vitrifaction, a tenacious co-adhesion of the gritty particles, and thus produce a firm and solid cutting, grinding, or polishing substance more cheap, durable, and efficient than any now in use.

I prefer to use as an alkaline silicate the clay technically known to potters as "slip-clay," which is found of good quality at Albany, in the State of New York.

Having thoroughly incorporated with this clay or its equivalent a proper proportion, as hereinafter more particularly given, of disintegrated emery or other gritty substances, I form the mass into a dough or paste with water and mold it into wheels or other desired shapes. These molded forms are then submitted to the degree of heat necessary to produce a vitrifaction of the silicious clay and the consequent adhesion with each other of the gritty particles intermingled therewith. The exact degree of heat is necessarily determined by the character and quality of the clay or other silicate.

An excellent grinding and polishing substance may be formed as described without other materials than those mentioned; but I have found that by adding pulverized charcoal or its equivalent a more porous and fast-cutting substance is obtained; that a small proportion of litharge or its equivalent will render the mass harder and more tenacious, and that the addition of manganese prevents the composition from reddening in baking and facilitates the vitrifaction by furnishing a certain supply of oxygen.

In combining the several ingredients which enter into the composition of my improved emery-wheels and other articles their proportions must necessarily differ, as the qualities of each ingredient varies, and must also be changed in order to obtain emery-wheels of different qualities and temper. For instance, the fusibility of the slip-clay or other alkaline silicious material is not always uniform, and hence the proportions thereof must vary; and again, where coarse emery or corundum is used, a larger proportion of clay is required than with fine emery.

The following proportions have, however, yielded satisfactory results, and may be therefore taken as a standard—viz: One hundred pounds of medium emery, eighteen pounds of Albany slip-clay, six pounds of litharge, one and one-half gallons of pulverized charcoal, one pound of black manganese, and of pure water sufficient to convert the materials into a dough or paste for molding.

The paste may be made so thin as to flow readily into the mold, being in such case dried, and if made into wheels turned down truly in a lathe before baking.

Having thus fully described my improved method of forming emery-wheels and other grinding, cutting, or polishing articles, what I claim therein as new, and desire to secure by Letters Patent, is—

The production of a solid and tenacious grinding or polishing substance by uniting particles of disintegrated emery or other equivalent gritty material with each other through the vitrifaction of an alkaline silicious substance combined therewith, substantially in the manner herein set forth.

In testimony of which invention I have hereunto set my hand this 5th day of May, 1864.

THOMAS NELSON.

In presence of—
CHARLES DRAKE,
GEO. A. MAYLAN.